Sept. 3, 1968          K. GROSSKOPF           3,399,973
           DETECTOR TUBE FOR HYDROGEN
             Filed June 10, 1964
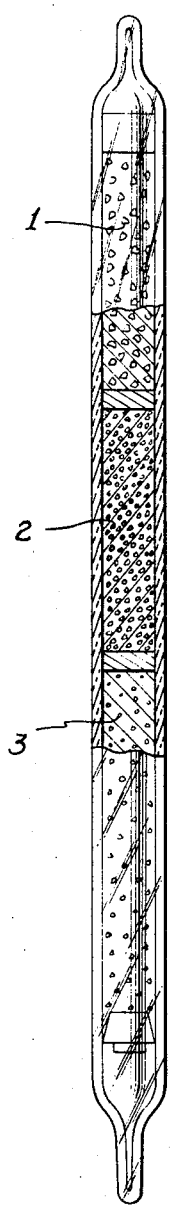
INVENTOR
*Karl Grosskopf*
BY *Bailey, Stephens and Huettig*
ATTORNEYS United States Patent Office 3,399,973
Patented Sept. 3, 1968

3,399,973
DETECTOR TUBE FOR HYDROGEN
Karl Grosskopf, Bad Schwartau, Germany, assignor to
Otto Heinrich Drager, Lubeck, Germany
Filed June 10, 1964, Ser. No. 373,959
Claims priority, application Germany, June 27, 1963,
D 41,845
5 Claims. (Cl. 23—254)

ABSTRACT OF THE DISCLOSURE

Transparent gas detector tube for colorimetrically indicating the presence of hydrogen in a gas containing oxygen as the gas is drawn through the tube. The transparent tube contains a layer of hopcalite for removing water vapor from the gas, a layer of catalyst to catalyze the oxidation of the hydrogen, and a layer which is capable of changing color in presence of the water vapor formed in the catalyst layer during the oxidation reaction.

---

This invention is directed to a detector tube for the colorimetric indication of the presence of hydrogen in a gas.

Detector tubes are used for the detection of certain components in a gas, such as air, by drawing the gas through the tube so that the component to be detected reacts with chemicals in the tube and usually produces a color reaction. The amount of the component detected can be indicated approximately from the extent of the reaction with the chemicals taken with the quantity of gas drawn through the tube. Such detector tubes have not been heretofore available for the indication of the presence of hydrogen since a reproducible reaction at normal temperatures and with a change in color were not known.

The object of this invention is to produce a detector tube for indicating the presence of hydrogen in a gas. In general, this object is accomplished by providing a detector tube with three layers of different chemicals. The first layer contacted by the gas drawn through the tube absorbs water vapor from the gas. The next or second layer is composed of the catalysts for oxidizing hydrogen at normal temperatures by the oxygen of the test gas for producing water vapors formed only from the hydrogen in the gas. The third layer is composed of a chemical which produces a color reaction by reason of the water vapors coming from the second layer. Thus this invention adds to the heretofore known detector tubes a tube which indicates the presence of hydrogen in a gas. In the first layer, a molecular sieve material or similar drying material is used for the absorption of water vapor contained in the raw gas. This material is preferably hopcalite and/or other catalysts which oxidize carbon monoxide as well as absorb water vapor. This has the advantage in that the hydrogen indication is not disturbed by the possibility of the presence of carbon monoxide in the raw gas. The carbon monoxide could, under certain circumstances, impair or disturb the activity of the catalysts in the second layer for oxidizing the hydrogen.

In the second layer are finely divided metallic precipitates of platinum, palladium, nickel or the like which are suitable as catalysts for the oxidizing of hydrogen either alone or mixed together. These precipitates are preferably deposited on a carrier, such as surface-active silica gel.

In the third layer for the colorimetric indication of the water vapor formed in the second layer is a ceramic carrier impregnated with a mixture of selenium dioxide and monohydrate of sulphuric acid and then activated by hydrocarbon vapors.

The means by which the objects of the invention are obtained are described more fully with reference to the accompanying drawing which shows a front elevational view of a detector tube according to this invention.

The detector tube is composed of a transparent material having frangible pointed ends which are adapted to be broken off when the tube is used so that the raw gas can be drawn through the tube. Within the tube are three different layers 1, 2 and 3 of chemicals for treating the raw gas drawn through the tube.

Layer 1 consists of molecular sieve particles having a size of from about 0.5 to 1.0 mm. and this layer is about 20 mm. long.

In order to initially eliminate carbon monoxide from the raw gas which might adversely affect subsequent reactions, it is preferred that the material of layer 1 is composed of hopcalite.

Layer 2 is for the purpose of oxidizing the hydrogen in the raw gas so that water vapors can be formed and passed to layer 3. Layer 2 is composed of a mixture formed as follows. About 2% by weight of metallic palladium is deposited upon silica gel having a loose or uncompacted weight of 500 grams per liter and a grain size of about 0.6 to 0.75 mm. A corresponding amount of palladium chloride is dissolved in a sufficient amount of water so that the silica gel is saturated with the solution during the impregnation. This impregnated gel is then treated in partial portions with an approximately 50% aqueous solution of hydrazine hydrate so at the end of the treatment an excess of the latter exists. The solution therefore covers the gel. This treatment is finished when no more gas is evolved. The impregnated and treated silica gel is then filtered by suction, then washed with water, and finally dried at a temperature of from about 150 to 180° C. until it reaches a constant weight. The material is then placed into the tube in a layer 2 having a length of about 25 mm.

Layer 3 is for the purpose of indicating the amount of water vapor coming from layer 2 and is formed as follows. 500 grams of a ceramic carrier, such as a sintered aluminum silicate having a particle size of from about 0.6 to 0.75 mm., is impregnated with a solution of 15 grams of selenium dioxide in 100 milliliters of water and then dried at a temperature of from 100 to 140° C. until a constant weight is reached. 100 grams of this material is homogeneously impregnated with 1.6 milliliters of monohydrate of sulphur acid. This product is then treated with the vapors of 0.6 milliliters petroleum benzine or pentane. This material, which was originally white, changes to an even yellow color. The material is then filled into the tube to form the layer 3 having a length of about 30 mm.

As is customary, the detector tube of this invention is used by first breaking off the pointed ends of the tube and then attaching the layer 3 end of the tube to a gas detector pump. The pump produces a gas flow through the tube at the rate of approximately between 50 and 100 liters per hour. As the raw gas is drawn through the tube, layer 3 will indicate the approximate hydrogen content in the gas by changing in color in shades from yellow to red. The test curve, plotted with the concentration shown on one axis and the color lengths produced in layer 3 on the other axis, is linear. In an amount of test gas of about 0.5 liter, the quantity of hydrogen between 0 and 5 volumes-percent is measured by the length of the colored zone in layer 3.

The linear test curve is due to the fact that, because, for all practical purposes, water vapor is produced rather than being absorbed in catalytic layer 2. This catalytic reaction is quite exothermic and which causes layer 2 to glow under certain circumstances. The capillaries of the granular material contained in layers 1 and 3 on both sides of layer 2 act as a barrier against ignition.

According to a further feature of the invention, the detector tube is provided with a protective jacket of synthetic material around layer 2 so that ignition is prevented should a detector tube break accidentally.

The detector tube of this invention has practically an unlimited shelf life.

Having now described the means by which the objects of the invention are obtained,

I claim:

1. A detector tube for colorimetrically indicating the presence of hydrogen in a gas containing oxygen comprising
    a transparent tube through which said gas is drawn for the purpose of conducting said indicating therein, and
    arranged in said tube, sequentially, and in the direction of the flow of said gas through said tube,
    a first layer of hopcalite for absorbing water vapor from said gas,
    a second layer of catalyst comprising a metallic catalyst deposited upon a carrier, said catalyst being capable of catalyzing the oxidation of said hydrogen by said oxygen at normal temperatures, and
    a third layer which is capable of changing color, with a hydrocarbon selected from the group consisting of pentane and petroleum benzine to obtain a yellow color, when contacted with water vapor and comprising a mixture of selenium dioxide and monohydrate of sulfuric acid.

2. A detector tube as in claim 1 in which said metallic catalyst comprises a palladium salt reduced with hydrazine hydrate.

3. A detector tube as in claim 1 in which said third layer comprises a ceramic carrier first impregnated with said mixture of selenium dioxide and monohydrate of sulfuric acid and then treated with a vaporized hydrocarbon selected from the group consisting of pentane and petroleum benzine to obtain the yellow activated layer.

4. A detector tube as in claim 3 in which said hydrocarbon is pentane.

5. A detector tube as in claim 3 in which said hydrocarbon is petroleum benzine.

References Cited

UNITED STATES PATENTS

| 2,396,190 | 3/1946 | Morgan et al. | 23—288 |
| 2,582,885 | 1/1952 | Rosenblatt | 23—232 X |
| 3,112,998 | 12/1963 | Grosskopf | 23—232 X |

OTHER REFERENCES

Minchin, L. T., Chem. & Ind. March 6, 1948, pp. 147–149. Copy in 23–232 lit.

Waitkins, G. R. & Clark, C. W., Chem. Rev. 236, 235(945) pp. 237, 256 relied on. Copy in 23–139 lit.

MORRIS O. WOLK, *Primary Examiner.*

R. M. REESE, *Assistant Examiner.*